(12) United States Patent
Wang et al.

(10) Patent No.: US 12,523,712 B1
(45) Date of Patent: Jan. 13, 2026

(54) ENERGY EFFICIENCY TESTING DEVICE AND METHOD FOR ELECTRIC OVEN

(71) Applicant: Jiangsu Vnuo Certification and Testing Co., Ltd., Jiangsu (CN)

(72) Inventors: Dongqi Wang, Jiangsu (CN); Xin He, Jiangsu (CN); Lingquan Xiang, Jiangsu (CN); Pengliang Guo, Jiangsu (CN)

(73) Assignee: Jiangsu Vnuo Certification and Testing Co., Ltd., Suqian (CN)

( * ) Notice: Subject to any disclaimer, the term of this patent is extended or adjusted under 35 U.S.C. 154(b) by 0 days.

(21) Appl. No.: 19/228,676

(22) Filed: Jun. 4, 2025

(30) Foreign Application Priority Data

Jul. 9, 2024 (CN) .......................... 202410915470.4

(51) Int. Cl.
  *G01R 31/56* (2020.01)
  *G01K 1/14* (2021.01)
  *G01R 1/02* (2006.01)
  *G01R 1/04* (2006.01)

(52) U.S. Cl.
  CPC .............. *G01R 31/56* (2020.01); *G01K 1/14* (2013.01); *G01R 1/025* (2013.01); *G01R 1/0408* (2013.01)

(58) Field of Classification Search
  CPC ...... G01R 31/56; G01R 1/025; G01R 1/0408; G01K 1/14; B65G 15/64
  See application file for complete search history.

(56) References Cited

U.S. PATENT DOCUMENTS

2018/0148265 A1* 5/2018 Puttonen ................ B65G 15/64

FOREIGN PATENT DOCUMENTS

| CN | 116280862 A | * | 6/2023 | ............... G01R 1/04 |
| CN | 117706411 A | | 3/2024 | |

* cited by examiner

*Primary Examiner* — John E Breene
*Assistant Examiner* — Janice M Soto

(57) ABSTRACT

Disclosed are an energy efficiency testing device and method for an electric oven. The device includes a base, further including a clamping device and a correction device, a conveying device arranged on an inner wall surface of the base, an electric oven body arranged at a top of the conveying device, a testing platform fixedly mounted at a top of the base, a detection device fixedly mounted on a surface of the testing platform, and a display fixedly mounted at a top of the testing platform. The clamping device includes a support frame, a temperature sensor, an electric push rod, a push plate, an elastic telescopic rod, a connecting plate, and sponge blocks. The support frame is fixedly mounted at the top of the base, and the temperature sensor is fixedly mounted at a top of the support frame.

4 Claims, 5 Drawing Sheets

ENERGY EFFICIENCY TESTING DEVICE AND METHOD FOR ELECTRIC OVEN

CROSS-REFERENCE TO RELATED APPLICATION

This application claims priority of Chinese Patent Application No. 202410915470.4, filed on Jul. 9, 2024, the entire contents of which are incorporated herein by reference.

TECHNICAL FIELD

The present disclosure relates to the technical field of electrical performance testing, and particularly relates to an energy efficiency testing device and method for an electric oven.

BACKGROUND

An energy efficiency testing device for an electric oven is a device used to evaluate the energy efficiency performance of an electric oven, and is usually composed of various sensors, a data acquisition system, and testing software.

Chinese Patent Publication No. CN212060450U relates to a microwave oven energy efficiency testing device, including a workbench. The workbench is provided with an electronic scale and a water container placed on the electronic scale, a test sample connected to a variable frequency power supply, and a test computer from left to right sequentially. A water outlet aligned with the water container, a digital electrical parameter tester connected to the test computer, and a data acquisition card are arranged at a top of the workbench, where the data acquisition card is connected to an anti-interference platinum resistor, a temperature sensing head is placed in the water container, the data acquisition card is further connected to a cavity temperature sensor, and the temperature sensing head is placed at a center of a cavity of the test sample. A voltage regulator and a constant-temperature water production device connected to the variable frequency power supply are arranged below the workbench, and the voltage regulator is sequentially connected to the digital electrical parameter tester and a test power socket arranged above the test sample. The constant-temperature water production device is connected to the test computer, the constant-temperature water production device is provided with a PLC controller, and the PLC controller is connected to a touch screen. The test device is provided with the constant-temperature water production device to improve work efficiency and test accuracy, and water temperature is measured in the cavity, such that the test accuracy is high.

In the above patent, the constant-temperature water production device is arranged to improve work efficiency and test accuracy. Water temperature is measured in the cavity, such that the test accuracy is high. However, during the test process, the device maybe is placed properly, and the electric oven may be too close to or too far away from the testing device, which will result in failure to accurately align with an access port of the electric oven during the test, thereby affecting the energy efficiency testing.

SUMMARY

In order to overcome the defects of the prior art, the present disclosure provides an energy efficiency testing device and method for an electric oven, which solves the technical problems mentioned in the above Background.

In order to achieve the above objective, the present disclosure is achieved by the following technical solution: an energy efficiency testing device for an electric oven, includes a base, further including a clamping device and a correction device, a conveying device arranged on an inner wall surface of the base, an electric oven body arranged at a top of the conveying device, a testing platform fixedly mounted at a top of the base, a detection device fixedly mounted on a surface of the testing platform, and a display fixedly mounted at a top of the testing platform; the clamping device includes a support frame, a temperature sensor, an electric push rod, a push plate, an elastic telescopic rod, a connecting plate, and sponge blocks, the conveying device drives the electric oven body into a detection area; when the electric push rod is activated, the electric push rod pushes the push plate to move in a direction closer to the electric oven body, and the electric oven body is clamped through the push plate; the support frame is fixedly mounted at the top of the base, the temperature sensor is fixedly mounted at a top of the support frame, the electric push rod is fixedly mounted on a surface of the support frame, the push plate is fixedly mounted at an output end of the electric push rod, the elastic telescopic rod is fixedly mounted on an inner wall of the push plate, the connecting plate is fixedly mounted at a free end of the elastic telescopic rod, the sponge blocks are fixedly mounted on a surface of the connecting plate, and the number of the sponge blocks is nine; and the correction device for correcting the electric oven body is arranged at the top of the base, movement of the push plate in the direction closer to the electric oven body drives the elastic telescopic rod to move in the direction closer to the electric oven body, and movement of the elastic telescopic rod in the direction closer to the electric oven body drives the connecting plate to move in the direction closer to the electric oven body.

According to the above technical solution, the detection device is electrically connected to the display, and the temperature sensor is electrically connected to the display.

According to the above technical solution, the correction device includes a short rod, a connecting rope, a round rod, a hollow column, a rotating rod, and a rotating plate, movement of the push plate in the direction closer to the electric oven body drives the short rod to move in the direction closer to the electric oven body, the short rod is fixedly mounted at a bottom of the push plate, the round rod is fixedly mounted at the top of the base, the hollow column is fixedly mounted at a top of the round rod, the rotating rod is rotatably mounted at the top of the base, the rotating plate is fixedly mounted on a surface of the rotating rod, one end of the connecting rope is fixedly mounted on a surface of the short rod, and the other end of the connecting rope is fixedly mounted on a surface of the rotating plate.

According to the above technical solution, the connecting rope is in contact with a surface of the round rod, and a first torsion spring is arranged between the rotating rod and the base.

According to the above technical solution, a limiting device and an anti-static device are further included, where the limiting device includes a square plate, a long plate, a slide bar, a connecting block, a sliding rod, and a square block, rotation of the rotating plate in the direction closer to the electric oven body drives the square plate to rotate, rotation of the square plate drives the long plate to rotate, the square plate is fixedly mounted on a surface of the rotating plate, the long plate is fixedly mounted at a bottom of the square plate, the slide bar is slidably mounted at the top of the base, the connecting block is fixedly mounted on a surface of the slide bar, the sliding rod slidably penetrates through a surface of the connecting block, the square block is fixedly mounted on a surface of the sliding rod, a first spring is arranged between the slide bar and the base, the slide bar is driven to reset through an elastic force of the first spring, a second spring is arranged between the sliding rod and the connecting block, the sliding rod is driven to reset through an elastic force of the second spring, and a sponge is arranged on a surface of the square block.

According to the above technical solution, a long rod is fixedly mounted on the surface of the square block, a controller is fixedly mounted on the surface of the connecting block, before contact with the connecting block, the electric oven body comes into contact with the square block, the square block pushes the long rod to contact the controller, and the electric push rod is deactivated through the controller.

According to the above technical solution, the anti-static device includes a guide rod, an L-shaped rod, an elastic telescopic connecting rod, a pulley, and a concave plate, an elastic force of the elastic telescopic connecting rod drives the pulley to contact the conveying device, static electricity generated by the conveying device is introduced into the elastic telescopic connecting rod through the pulley due to contact between the pulley and the conveying device, the guide rod fixedly penetrates through the surface of the base, the L-shaped rod is fixedly mounted at a top of the guide rod, the elastic telescopic connecting rod is fixedly mounted on a surface of the L-shaped rod, the pulley is rotatably mounted at a free end of the elastic telescopic connecting rod, and the concave plate is fixedly mounted at a fixed end of the elastic telescopic connecting rod.

According to the above technical solution, the pulley is in contact with a surface of the conveying device, and the concave plate is in contact with the top of the conveying device.

A method for testing with an energy efficiency testing device for an electric oven includes the following steps:
- S1: driving the electric oven body into a detection area through the conveying device;
- S2: activating the electric push rod, pushing the push plate to move in a direction closer to the electric oven body through the electric push rod, and clamping the electric oven body through the push plate;
- S3: driving the elastic telescopic rod to move in the direction closer to the electric oven body through movement of the push plate in the direction closer to the electric oven body, and driving the connecting plate to move in the direction closer to the electric oven body through movement of the elastic telescopic rod in the direction closer to the electric oven body; and
- S4: driving the sponge blocks to move in the direction closer to the electric oven body through movement of the connecting plate in direction closer to the electric oven body, where the sponge blocks are in contact with the electric oven body to prevent damage to the electric oven body during clamping, so as to avoid economic losses.

The present disclosure provides an energy efficiency testing device and method for an electric oven The present disclosure has the following beneficial effects:

(1) In the present disclosure, the conveying device drives the electric oven to a designated position for energy efficiency testing, and the electric push rod drives the push plate to clamp the electric oven during the testing, such that the electric oven body remains centered, which prevents inaccurate insertion of the detection device into the access port when the detection device is too close to or too far from the electric oven body, thereby avoiding affecting energy efficiency testing of the electric oven. Additionally, the elastic telescopic rod serves as a buffer during clamping, which prevents damage to the electric oven, and avoids economic losses.

(2) In the present disclosure, the push plate clamps the electric oven and pulls the connecting rope, the connecting rope drives the rotating plate to rotate, and the connecting rope is arranged inside the hollow column, which further protects the connecting rope. Additionally, pulling of the connecting rope drives the rotating plate to rotate, and the electric oven is calibrated by rotating the rotating plate to prevent positional deviations of the electric oven so as to avoid affecting energy efficiency testing.

(3) In the present disclosure, rotation of the rotating plate drives the slide bar to slide, and the slide bar drives the connecting block to limit any other electric oven on the conveying device, which prevents two devices from colliding with each other, thereby avoiding damage to the device. Limiting causes the sliding rod to retract when the device is located between the connecting blocks, and the sliding rod extends and retracts to contact the controller to deactivate the electric push rod, which prevents damage to the electric oven when the connecting block limits the electric oven body and the electric oven does not fully enter a designated area, so as to ensure normal use.

(4) In the present disclosure, the pulley is in contact with the conveying device, and the guide rod eliminates static electricity on the conveying device, which prevents generation of static electricity caused by long-term friction of the conveying device, where static electricity may affect accuracy of energy efficiency testing. Additionally, the concave plate is in contact with the conveying device, which prevents edges of the conveying device from warping and ensures stability of the device.

Figure 1:
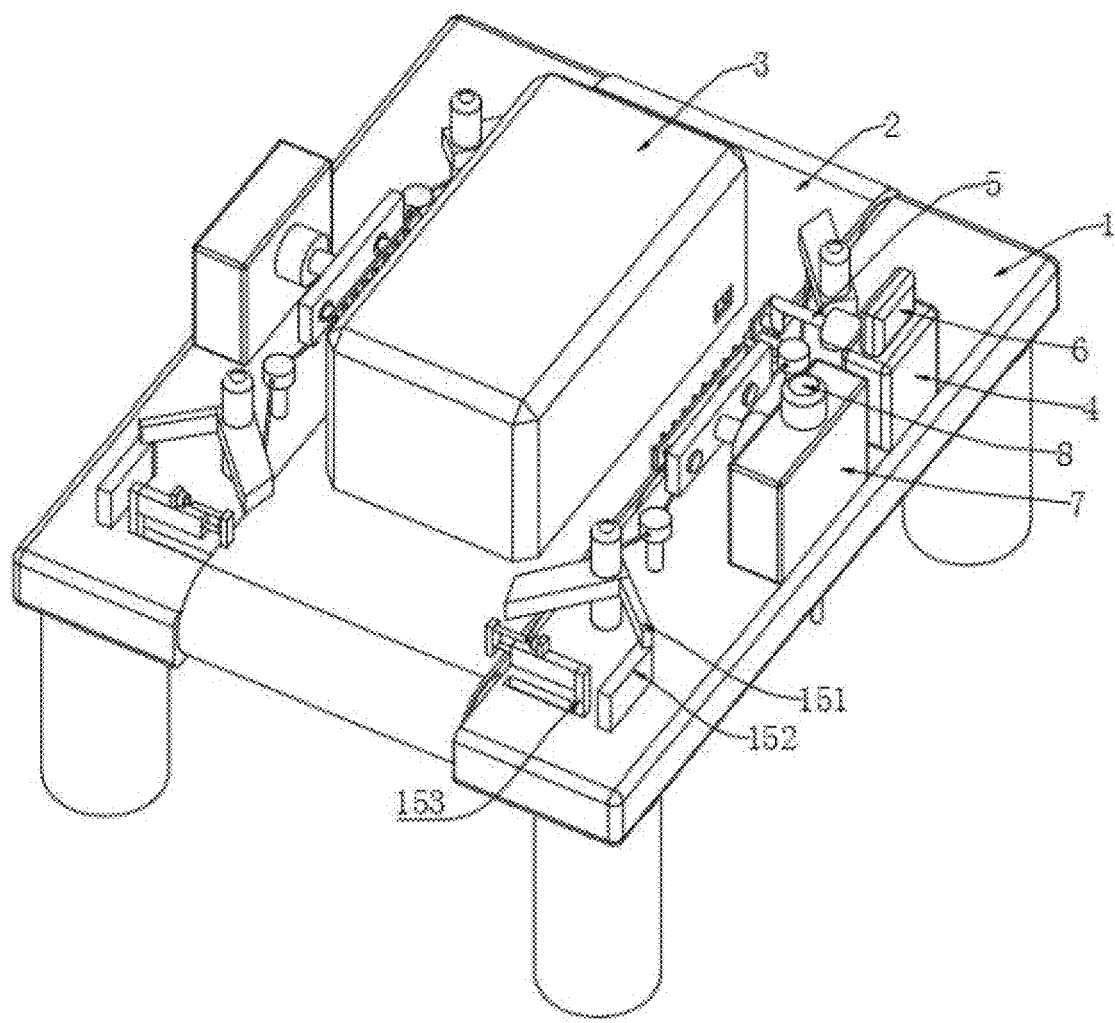
FIG. 1 is a schematic diagram of an overall structure of the present disclosure.

Reference numerals in the figures: 1—base; 2—conveying device; 3—electric oven body; 4—testing platform; 5—detection device; 6—display; 7—support frame; 8—temperature sensor; 9—electric push rod; 10—push plate; 11—elastic telescopic rod; 12—connecting plate; 13—sponge block; 141—short rod; 142—connecting rope; 143—round rod; 144—hollow column; 145—rotating rod; 146—rotating plate; 151—square plate; 152—long plate; 153—slide bar; 154—connecting block; 155—sliding rod; 156—square block; 157—long rod; 158—controller; 161— guide rod; 162—L-shaped rod; 163—elastic telescopic connecting rod; 164—pulley; and 165—concave plate.

DETAILED DESCRIPTIONS OF THE EMBODIMENTS

The technical solutions in the examples of the present disclosure will be clearly and completely described below in combination with the accompanying drawings in the examples of the present disclosure. Apparently, the examples described are merely some rather than all of the examples of the present disclosure. All other examples acquired by those of ordinarily skilled in the art without making creative efforts based on the examples of the present disclosure fall within the scope of protection of the present disclosure.

Figure 2:
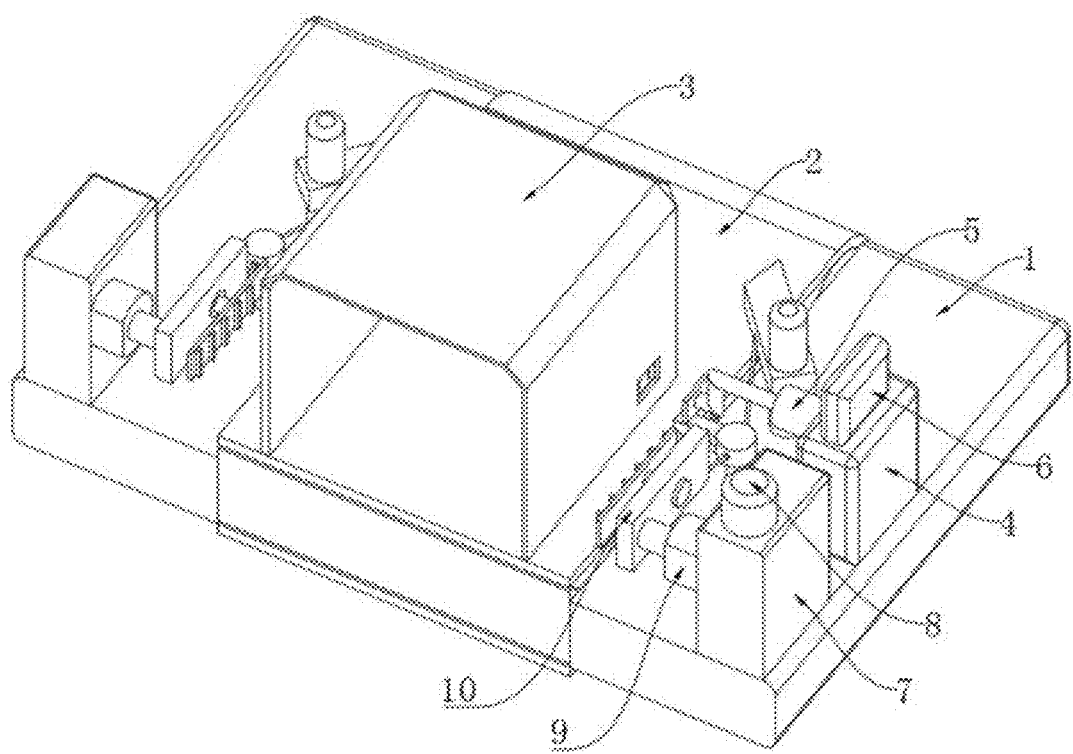
FIG. 2 is a schematic diagram of an overall sectional structure of the present disclosure.
Figure 3:
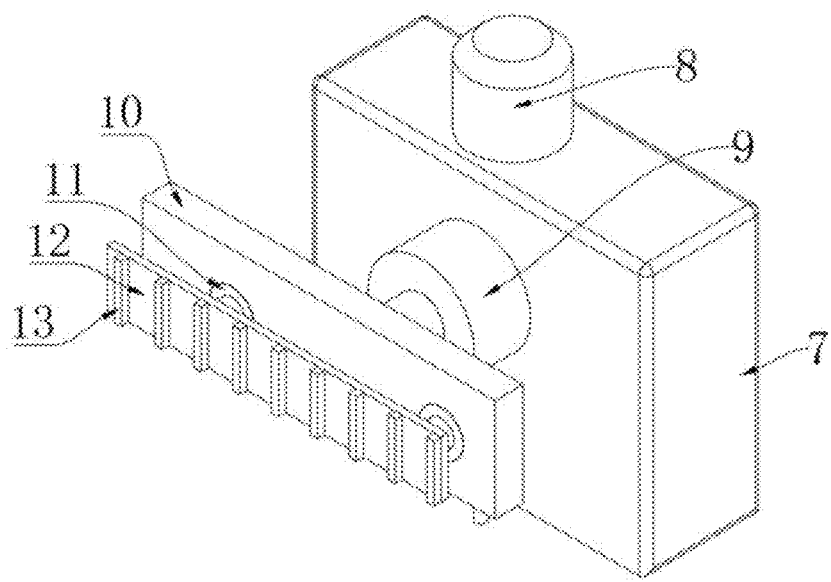
FIG. 3 is a schematic structural diagram of a clamping device of the present disclosure.
Figure 4:
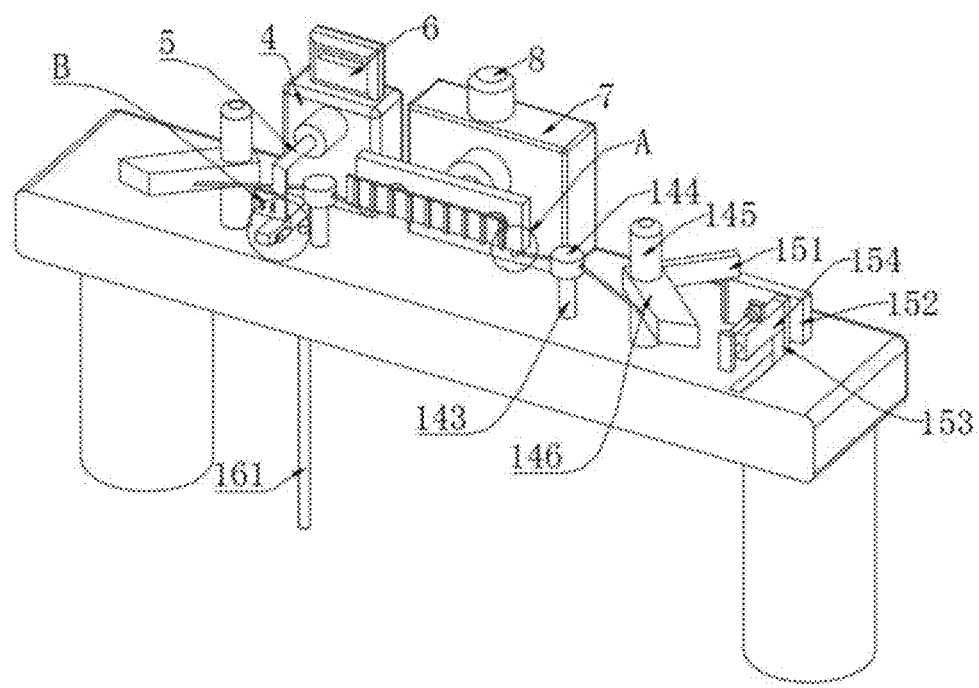
FIG. 4 is a schematic structural diagram of a top of a base of the present disclosure.

With reference to FIGS. 1-4, an example of the present disclosure is as follows: an energy efficiency testing device for an electric oven, includes a base 1, further including a clamping device and a correction device, a conveying device 2 arranged on an inner wall surface of the base 1, an electric oven body 3 arranged at a top of the conveying device 2, a testing platform 4 fixedly mounted at a top of the base 1, a detection device 5 fixedly mounted on a surface of the testing platform 4, and a display 6 fixedly mounted at a top of the testing platform 4; the clamping device includes a support frame 7, a temperature sensor 8, an electric push rod 9, a push plate 10, an elastic telescopic rod 11, a connecting plate 12, and sponge blocks 13, prevents displacement of the electric oven body 3 when the detection device 5 is inserted into an access port of the electric oven body 3, and prevents inaccurate insertion of the detection device 5 into the access port when the electric oven body 3 is too close to or too far from the detection device 5, so as to avoid affecting energy efficiency testing of the electric oven, where the support frame 7 is fixedly mounted at the top of the base 1, the temperature sensor 8 is fixedly mounted at a top of the support frame 7, the electric push rod 9 is fixedly mounted on a surface of the support frame 7, the push plate 10 is fixedly mounted at an output end of the electric push rod 9, the elastic telescopic rod 11 is fixedly mounted on an inner wall of the push plate 10, the connecting plate 12 is fixedly mounted at a free end of the elastic telescopic rod 11, the sponge blocks 13 are fixedly mounted on a surface of the connecting plate 12, and the number of the sponge blocks 13 is nine; and the correction device for correcting the electric oven body 3 is arranged at the top of the base 1 to prevent damage to the electric oven body 3 from a clamping force during a correction process, so as to avoid economic losses.

The detection device 5 is electrically connected to the display 6, and the temperature sensor 8 is electrically connected to the display 6.

The correction device includes a short rod 141, a connecting rope 142, a round rod 143, a hollow column 144, a rotating rod 145, and a rotating plate 146, where the short rod 141 is fixedly mounted at a bottom of the push plate 10, the round rod 143 is fixedly mounted at the top of the base 1, the hollow column 144 is fixedly mounted at a top of the round rod 143, the rotating rod 145 is rotatably mounted at the top of the base 1, the rotating plate 146 is fixedly mounted on a surface of the rotating rod 145, one end of the connecting rope 142 is fixedly mounted on a surface of the short rod 141, and the other end of the connecting rope 142 is fixedly mounted on a surface of the rotating plate 146. The electric oven body 3 is calibrated by pushing the electric oven body 3 to prevent positional deviations of the electric oven so as to avoid affecting energy efficiency testing.

The connecting rope 142 is in contact with a surface of the round rod 143, a first torsion spring is arranged between the rotating rod 145 and the base 1, and the rotating rod 145 is driven to reset by means of the first torsion spring.

In this example, the conveying device 2 drives the electric oven body 3 into a detection area, when the electric push rod 9 is activated, the electric push rod 9 pushes the push plate 10 to move in a direction closer to the electric oven body 3, and the electric oven body 3 is clamped through the push plate 10, which prevents the electric oven body 3 from being too close or too far away from the detection device 5 when the detection device 5 is inserted into an access port of the electric oven body 3, and prevents inaccurate insertion of the detection device 5 into the access port, thereby avoiding affecting energy efficiency testing of the electric oven. Moreover, movement of the push plate 10 in the direction closer to the electric oven body 3 drives the elastic telescopic rod 11 to move in the direction closer to the electric oven body 3, movement of the elastic telescopic rod 11 in the direction closer to the electric oven body 3 drives the connecting plate 12 to move in the direction closer to the electric oven body 3, and movement of the connecting plate 12 in the direction closer to the electric oven body 3 drives the sponge blocks 13 to move in the direction closer to the electric oven body 3. The sponge blocks 13 are in contact with the electric oven body 3 to prevent damage to the electric oven body 3 during clamping, so as to avoid economic losses.

Movement of the push plate 10 in the direction closer to the electric oven body 3 drives the short rod 141 to move in the direction closer to the electric oven body 3, and movement of the short rod 141 in the direction closer to the electric oven body 3 pulls the connecting rope 142. The connecting rope 142 is in contact with the round rod 143, such that the connecting rope 142 pulls the rotating plate 146 to rotate in the direction closer to the electric oven body 3. When rotating in the direction closer to the electric oven body 3, the rotating plate 146 may be in contact with the electric oven body 3. The electric oven body 3 is calibrated by pushing the electric oven body 3 to prevent positional deviations of the electric oven so as to avoid affecting energy efficiency testing.

Figure 5:
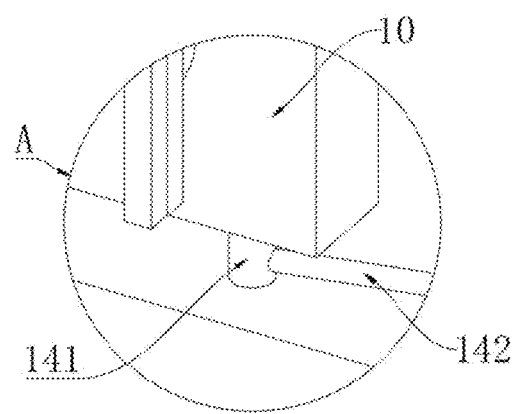
FIG. 5 is an enlarged schematic structural diagram of part A in FIG. 4 of the present disclosure.
Figure 6:
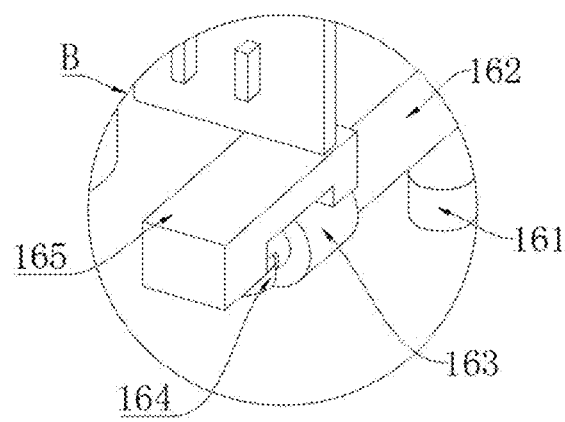
FIG. 6 is an enlarged schematic structural diagram of part B in FIG. 4 of the present disclosure.
Figure 7:
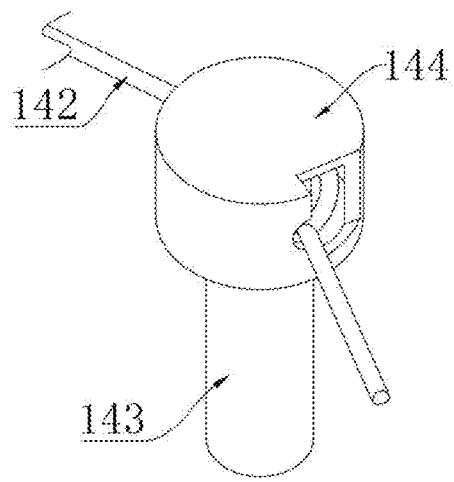
FIG. 7 is a schematic diagram of an internal structure of a hollow column of the present disclosure.
Figure 8:
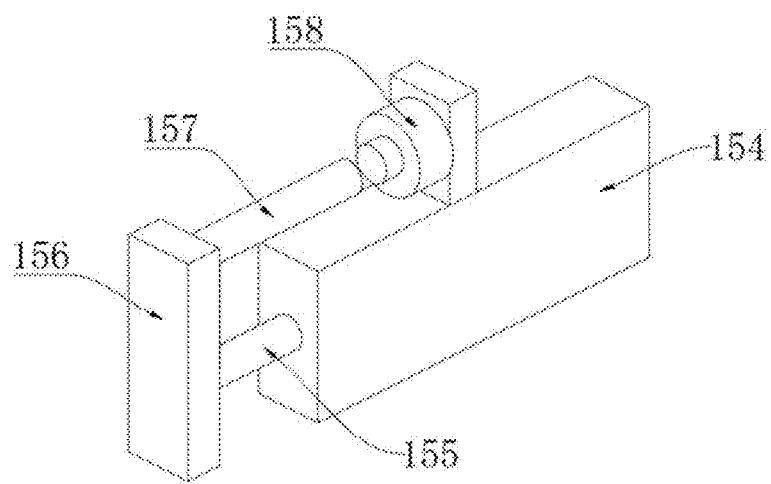
FIG. 8 is a schematic structural diagram of a protective device of the present disclosure.

With reference to FIGS. 1-8, in another example of the present disclosure based on the above example, a limiting device and an anti-static device are further included, where the limiting device includes a square plate 151, a long plate 152, a slide bar 153, a connecting block 154, a sliding rod 155, and a square block 156, where the square plate 151 is fixedly mounted on a surface of the rotating plate 146, the long plate 152 is fixedly mounted at a bottom of the square plate 151, the slide bar 153 is slidably mounted at the top of the base 1, the connecting block 154 is fixedly mounted on a surface of the slide bar 153, the sliding rod 155 slidably penetrates through a surface of the connecting block 154, and the square block 156 is fixedly mounted on a surface of the sliding rod 155. A first spring is arranged between the slide bar 153 and the base 1, the slide bar 153 is driven to reset through an elastic force of the first spring, a second spring is arranged between the sliding rod 155 and the connecting block 154, the sliding rod 155 is driven to reset through an elastic force of the second spring, and a sponge is arranged on a surface of the square block 156 to prevent two devices from colliding with each other, so as to avoid damage to the device and ensure energy efficiency testing.

A long rod 157 is fixedly mounted on the surface of the square block 156, and a controller 158 is fixedly mounted on the surface of the connecting block 154, to prevent damage to the electric oven body 3 during clamping when the connecting block 154 limits the electric oven body 3 and the electric oven body 3 does not fully enter a designated area, so as to ensure normal use.

The anti-static device includes a guide rod 161, an L-shaped rod 162, an elastic telescopic connecting rod 163, a pulley 164, and a concave plate 165, where the guide rod 161 fixedly penetrates through the surface of the base 1, the L-shaped rod 162 is fixedly mounted at a top of the guide rod 161, the elastic telescopic connecting rod 163 is fixedly mounted on a surface of the L-shaped rod 162, the pulley 164 is rotatably mounted at a free end of the elastic telescopic connecting rod 163, and the concave plate 165 is fixedly mounted at a fixed end of the elastic telescopic connecting rod 163 to prevent generation of static electricity caused by long-term friction of the conveying device 2, and static electricity may affect accuracy of energy efficiency testing.

The pulley 164 is in contact with a surface of the conveying device 2, and the concave plate 165 is in contact with the top of the conveying device 2.

A method for testing with an energy efficiency testing device for an electric oven includes the following steps:

S1: drive the electric oven body 3 into a detection area through the conveying device 2;

S2: activate the electric push rod 9, push the push plate 10 to move in a direction closer to the electric oven body 3 through the electric push rod 9, and clamp the electric oven body 3 through the push plate 10;

S3: drive the elastic telescopic rod 11 to move in the direction closer to the electric oven body 3 through movement of the push plate 10 in the direction closer to the electric oven body 3, and drive the connecting plate 12 to move in the direction closer to the electric oven body 3 through movement of the elastic telescopic rod 11 in the direction closer to the electric oven body 3; and S4: drive the sponge blocks 13 to move in the direction closer to the electric oven body 3 through movement of the connecting plate 12 in the direction closer to the electric oven body 3, where the sponge blocks 13 are in contact with the electric oven body 3 to prevent damage to the electric oven body 3 during clamping, so as to avoid economic losses.

In this example, rotation of the rotating plate 146 in the direction closer to the electric oven body 3 drives the square plate 151 to rotate, rotation of the square plate 151 drives the long plate 152 to rotate, and when rotating, the long plate 152 may be in contact with the slide bar 153. The long plate 152 pushes the slide bar 153 to move toward a middle of the conveying device 2, movement of the slide bar 153 toward the middle of the conveying device 2 drives the connecting block 154 to move toward the middle of the conveying device 2, and movement of the connecting block 154 toward the middle of the conveying device 2 restricts any other electric oven body 3 on the conveying device 2, which prevents two devices from colliding with each other, thereby avoiding damage to the device and ensuring energy efficiency testing. Additionally, before contact with the connecting block 154, the electric oven body 3 comes into contact with the square block 156, the square block 156 pushes the long rod 157 to contact the controller 158, and the electric push rod 9 is deactivated through the controller 158, which prevents damage to the electric oven body 3 during clamping when the connecting block 154 is limited and the electric oven body 3 does not fully enter a designated area, thereby ensuring normal use.

An elastic force of the elastic telescopic connecting rod 163 drives the pulley 164 to contact the conveying device 2, and static electricity generated by the conveying device 2 is introduced into the elastic telescopic connecting rod 163 through the pulley 164 due to contact between the pulley 164 and the conveying device 2, and then introduced into the guide rod 161 through the elastic telescopic connecting rod 163, which prevents generation of static electricity caused by long-term friction of the conveying device 2, where static electricity may affect accuracy of energy efficiency testing. Additionally, the concave plate 165 is in contact with the conveying device 2, which prevents edges of the conveying device 2 from warping and ensures stability of the device.

Although the examples of the present disclosure have been illustrated and described, it is to be understood that those of ordinary skill in the art may make various changes, modifications, replacements and variations to the above examples without departing from the principle and spirit of the present disclosure, and the scope of the present disclosure is limited by the appended claims and their legal equivalents.

The invention claimed is:

1. An energy efficiency testing device for an electric oven, comprising a base, further comprising a clamping device, a limiting device, an anti-static device, a conveying device arranged on an inner wall surface of the base, an electric oven body arranged at a top of the conveying device, a testing platform fixedly mounted at a top of the base, a detection device fixedly mounted on a surface of the testing platform, and a display fixedly mounted at a top of the testing platform;

the clamping device comprises a support frame, a temperature sensor, an electric push rod, a push plate, an elastic telescopic rod, a connecting plate, and sponge blocks, wherein the support frame is fixedly mounted at the top of the base, the temperature sensor is fixedly mounted at a top of the support frame, the electric push rod is fixedly mounted on a surface of the support frame, the push plate is fixedly mounted at an output end of the electric push rod, the elastic telescopic rod is fixedly mounted on an inner wall of the push plate, the connecting plate is fixedly mounted at a free end of the elastic telescopic rod, the sponge blocks are fixedly mounted on a surface of the connecting plate, and the number of the sponge blocks is nine;

a correction device for correcting the electric oven body is arranged at the top of the base;

the detection device is electrically connected to the display, and the temperature sensor is electrically connected to the display;

the correction device comprises a short rod, a connecting rope, a round rod, a hollow column, a rotating rod, and a rotating plate, wherein the short rod is fixedly mounted at a bottom of the push plate, the round rod is fixedly mounted at the top of the base, the hollow column is fixedly mounted at a top of the round rod, the rotating rod is rotatably mounted at the top of the base, the rotating plate is fixedly mounted on a surface of the rotating rod, one end of the connecting rope is fixedly mounted on a surface of the short rod, and the other end of the connecting rope is fixedly mounted on a surface of the rotating plate;

the connecting rope is in contact with a surface of the round rod, and a first torsion spring is arranged between the rotating rod and the base;

the limiting device comprises a square plate, a long plate, a slide bar, a connecting block, a sliding rod, and a square block, wherein the square plate is fixedly mounted on a surface of the rotating plate, the long plate is fixedly mounted at a bottom of the square plate, the slide bar is slidably mounted at the top of the base, the connecting block is fixedly mounted on a surface of the slide bar, the sliding rod slidably penetrates through a surface of the connecting block, the square block is fixedly mounted on a surface of the sliding rod, a first spring is arranged between the slide bar and the base, the slide bar is driven to reset through an elastic force of the first spring, a second spring is arranged between the sliding rod and the connecting block, the sliding rod is driven to reset through an elastic force of the second spring, and a sponge is arranged on a surface of the square block; and a long rod is fixedly mounted on the surface of the square block, and a controller is fixedly mounted on the surface of the connecting block.

2. The energy efficiency testing device for an electric oven according to claim 1, wherein the anti-static device comprises a guide rod, an L-shaped rod, an elastic telescopic connecting rod, a pulley, and a concave plate, wherein the guide rod fixedly penetrates through the surface of the base, the L-shaped rod is fixedly mounted at a top of the guide rod, the elastic telescopic connecting rod is fixedly mounted on a surface of the L-shaped rod, the pulley is rotatably mounted at a free end of the elastic telescopic connecting rod, and the concave plate is fixedly mounted at a fixed end of the elastic telescopic connecting rod.

3. The energy efficiency testing device for an electric oven according to claim 2, wherein the pulley is in contact with a surface of the conveying device, and the concave plate is in contact with the top of the conveying device.

4. A testing method for the energy efficiency testing device for an electric oven according to claim 1, comprising the following steps:
- S1: driving the electric oven body into a detection area through the conveying device;
- S2: activating the electric push rod, pushing the push plate to move in a direction closer to the electric oven body through the electric push rod, and clamping the electric oven body through the push plate;
- S3: driving the elastic telescopic rod to move in the direction closer to the electric oven body through movement of the push plate in the direction closer to the electric oven body, and driving the connecting plate to move in the direction closer to the electric oven body through movement of the elastic telescopic rod in the direction closer to the electric oven body; and
- S4: driving the sponge blocks to move in the direction closer to the electric oven body through movement of the connecting plate in the direction closer to the electric oven body, wherein the sponge blocks are in contact with the electric oven body to prevent damage to the electric oven body during clamping, so as to avoid economic losses.

* * * * *